Dec. 27, 1955  J. MIHALYI  2,728,281
FILM METERING FOR EXTRUSION-LOADING ROLL-HOLDING CAMERAS
Filed Jan. 8, 1952  3 Sheets-Sheet 1

Joseph Mihalyi
INVENTOR.
BY Daniel I. Mayne
Donald H. Stewart
ATTORNEYS

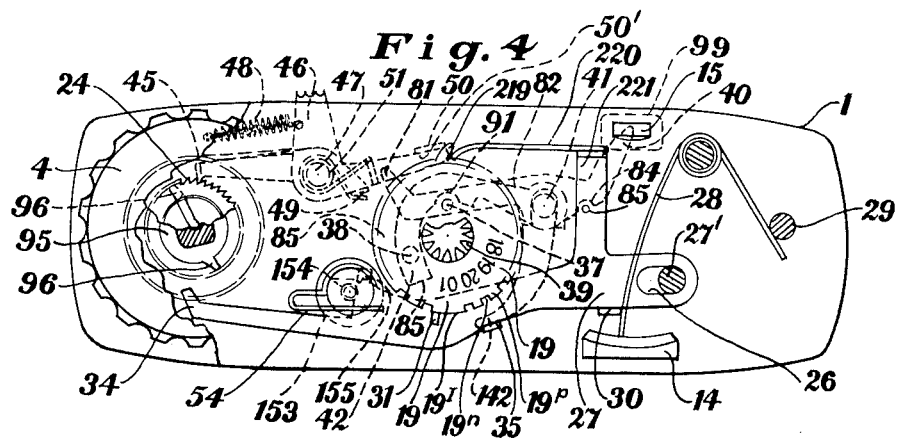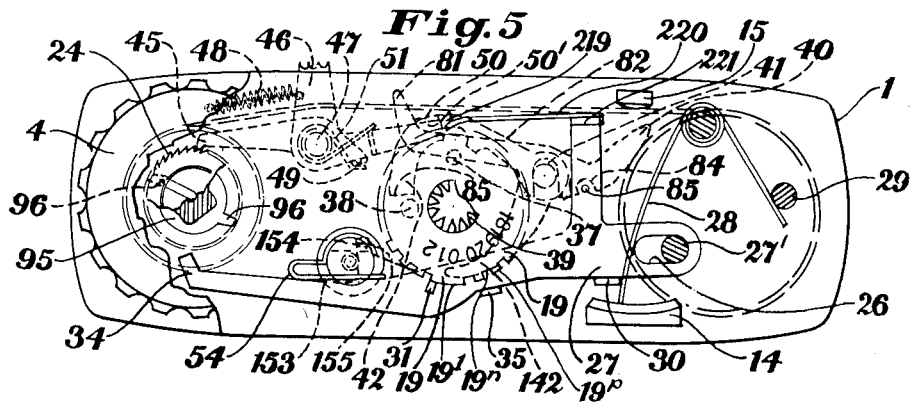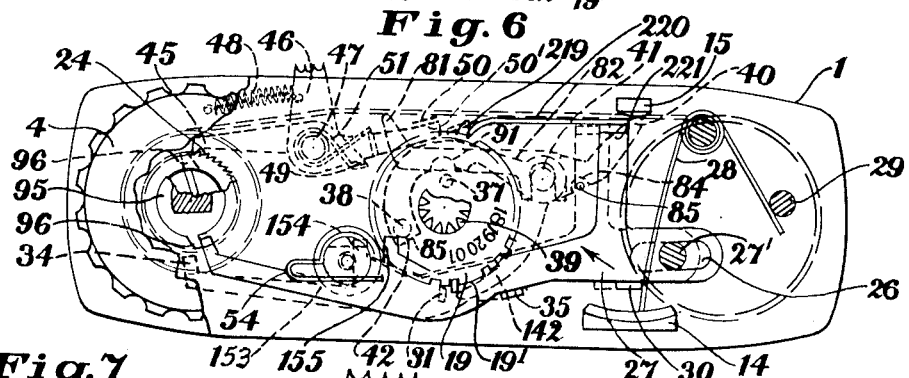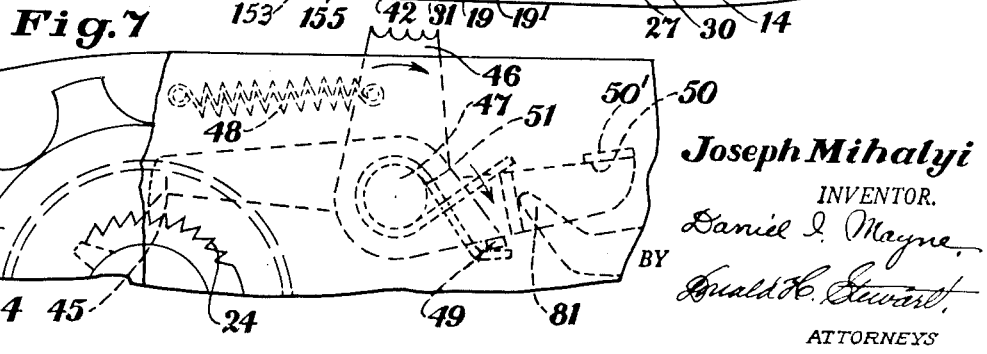

Dec. 27, 1955     J. MIHALYI     2,728,281
FILM METERING FOR EXTRUSION-LOADING ROLL-HOLDING CAMERAS
Filed Jan. 8, 1952     3 Sheets-Sheet 3
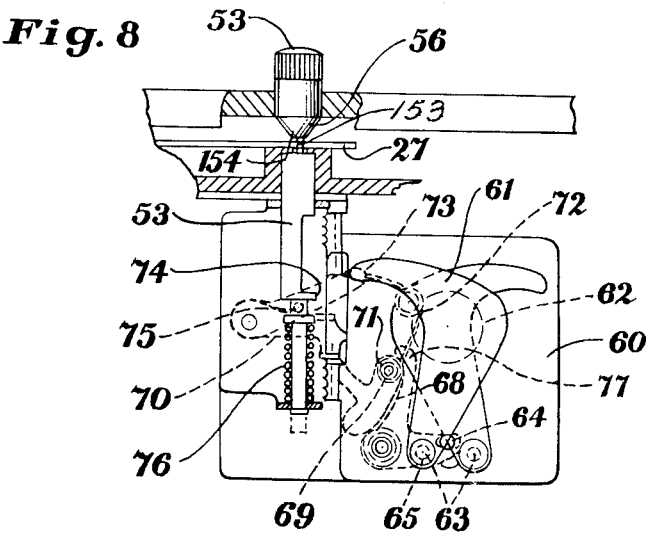
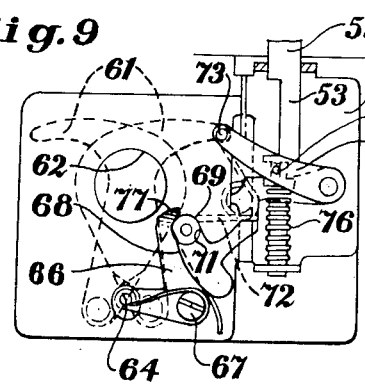
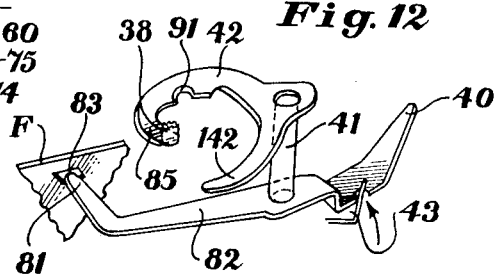
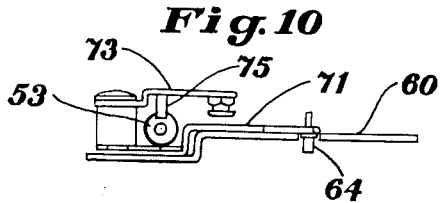
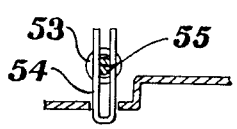
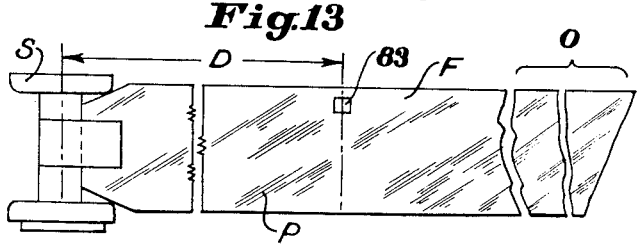
Joseph Mihalyi
INVENTOR.
ATTORNEYS

United States Patent Office 2,728,281
Patented Dec. 27, 1955

2,728,281

FILM METERING FOR EXTRUSION-LOADING ROLL-HOLDING CAMERAS

Joseph Mihalyi, Rochester, N. Y., assignor to Eastman Kodak Company, Rochester, N. Y., a corporation of New Jersey Application January 8, 1952, Serial No. 265,510

19 Claims. (Cl. 95—31)

This invention relates to photography and more particularly to a film metering and winding control for roll holding cameras of the extrusion-loading type.

Such cameras generally employ a film woud on a film spool from which the film is extruded or unwound by turning the film spool in one direction and then, by turning the film spool in a reverse direction, film may be wound back on the original spool. Generally such film is exposed on the winding back film movement although film may be exposed as it is unwound if desired. I prefer to make the exposures on the return film movement.

In the past, such cameras have had a number of disadvantages. It has generally been difficult to control the film extrusion, stopping this unwinding movement at the proper time. It has generally been difficult to control film winding in both directions without too complicated mechanism. It has generally been difficult to accurately measure film in one direction because of slack between the film and spool as reverse winding is started. These and other difficulties may have delayed marketing such apparatus.

An object of the present invention is to overcome the above and other difficulties. Another object of the invention is to provide a camera of the extrusion-loading type in which control of the film winding in both directions may be accomplished. Another object is to provide a camera in which film is automatically and intermittently wound back onto the original film spool as exposures are being made. Still another object is to provide a release for the film winding control after all exposures are made to facilitate winding the unexposed film on the spool. Another object of my invention is to provide a lock for both the trigger and film counter which locking means is automatically operable at all times except when a film is in the camera ready for exposure. Other objects will appear from the following specification, the novel features being particularly pointed out in the claims at the end thereof.

Coming now to the drawings in which like reference characters denote like parts throughout:

Fig. 4 is a view similar to Fig. 1, but with the parts shown after the film has been wound onto the film spool;

Fig. 5 is a view similar to Fig. 4, but with the parts in the position they assume after the film has been extruded to stop the extruding movement of the film;

Fig. 6 is a view similar to Fig. 5, but with the parts in the position they assume as film is being rewound and exposures are being made;

Fig. 7 is a fragmentary view showing the manual release lever and an associated pawl in a position to permit extrusion winding of the film;

Fig. 8 is a fragmentary front plan view of the camera shutter and the release trigger;

Fig. 9 is a similar fragmentary view taken from the rear of the shutter shown in Fig. 8;

Fig. 10 is a top plan view of a portion of the shutter-operating mechanism;

Fig. 11 is a fragmentary view of a shutter trigger controlling spring, parts being shown in section;

Fig. 12 is a fragmentary detail perspective view of the film control lever and the lever for adjusting the counter dial;

Fig. 13 is a fragmentary side elevation of a partially unrolled film and its spool.

Figure 1:
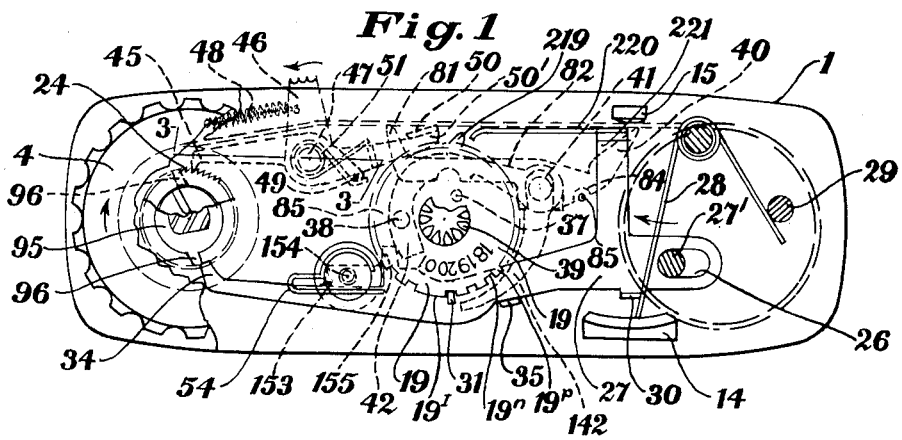
Fig. 1 is a top plan view of a camera with part of the top plate and knob being broken away to show a portion of the film-metering mechanism, parts being omitted for the sake of clearness.

In the preferred embodiment of my invention shown in the drawings, the camera may consist of a camera body 1 having a supply film spool chamber 2 and a storage chamber 3 into which a loose coil of film may be extruded. In moving the film from the chamber 2 to the chamber 3, it is moved through a channel or guideway such as shown in my Patent 2,559,892, granted July 10, 1951, so that by merely turning a winding knob 4, the film F may be moved through a channel 5 past an exposure frame 6 and into a loose coil in the chamber 3.

The film F on the spool S may be loaded into the chamber 2 through a door 7 which may be hinged at 8 to the bottom camera wall 9. This door may be held closed by a spring latch 10 snapping over a pin 11. The film F is provided with a single perforation 83 a distance D from the spool, that portion P of the film F between the aperture 83 and spool S forming an area which is not exposed. This is also true of the outer end O of the film.

Figure 2:
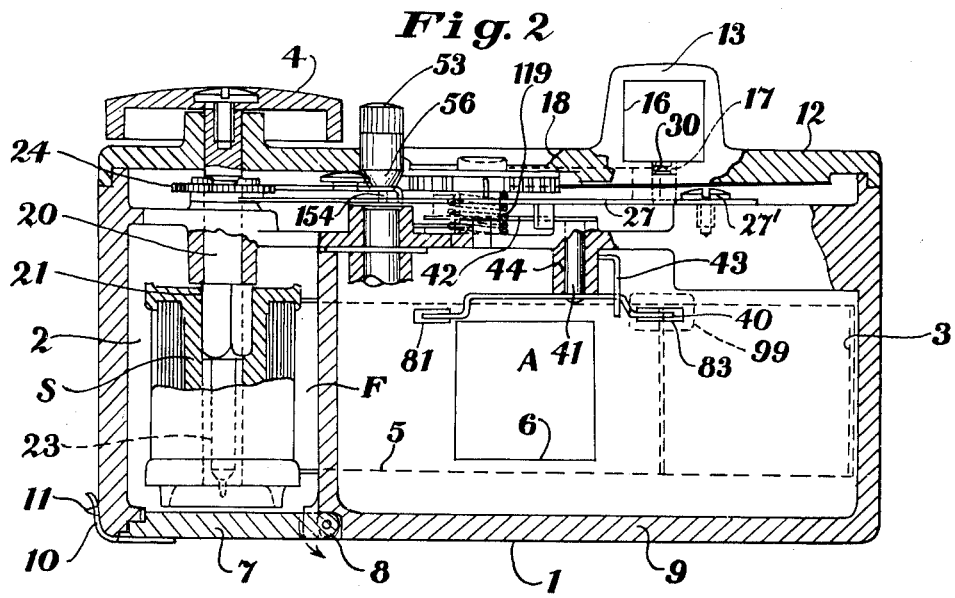
Fig. 2 is a transverse section through the camera shown in Fig. 1, with parts of the mechanism being broken away to better illustrate portions of the metering mechanism.

The top wall 12 of the camera may be provided with the usual finder 13 which, as diagrammatically shown in Fig. 1, may include a front lens 14 and a viewing lens 15, if desired. The frame 16 of the finder is notched out at 17 for a signal which will be hereinafter described. The top wall 12 also has a circular recess 18 above a dial 19 on which the number of exposures may be indicated, this dial 19 being affixed to, or made a part of, a notched indexing wheel which controls the film-winding movement. This includes notches $19^n$ and projections $19^p$ between the notches, the notches and projections being of equal size except for projection $19^i$ which is much longer than the others. Counter dial 19 can only turn in a counterclockwise direction because of the one-way clutch spring 119, Fig. 2, which in a well-known manner loosens and turns when the dial turns counterclockwise but tightens and locks when an attempt is made to turn it clockwise.

Since the film spool S must be turned in both directions, I have provided a film spool spindle 20, here shown as being a three-sided configuration on which a similar spool configuration 21 fits to drive the spool when the spindle 20 is turned by means of the winding knob 4. A ratchet wheel 24 is also affixed to the shaft and the bottom portion of the shaft 23 is preferably of reduced diameter and tapered to assist in guiding the film spool S axially into place.

There is an indexing lever 27, mounted on the top wall of the camera through a slot 26 and a pin 27' so that this lever may both turn and slide. A spring 28 normally moves the indexing lever to the left with reference to Fig. 1 since one end of this spring 28 engages a pin 29 and the other end engages a lug 30 on the indexing lever 27. This lever likewise includes an indexing wheel lug 31, a point 34 and a lug 35, all of which, of course, move when the indexing lever 27 moves.

The counter dial 19 is preferably a molded plastic part that rotates in a counterclockwise direction when driven by the lug 31 on indexing lever 27 and is held from clockwise rotation by a clutch spring 119. A locking lug 37, an indexing lug 38 and the manual setting knob 39 are all preferably part of the molded counter dial 19. There is a claw 40, pivotally mounted on a shaft 41 normally resting on the film F. There is also a counter lock lever 42 and a spring 43 held in the bearing 44 on the camera body 1. The shaft 41 fits loosely in bearing 44 which is elongated to permit the lower end of the shaft to spring from its normal axis of rotation. This assists in pressing claw 40 and point 81 against a film F with pressure permitting winding the film and with sufficient resiliency to cause the point 81 to pass well into a film aperture 83 when it reaches the point 81.

Figure 3:
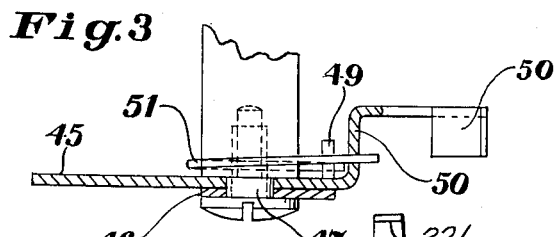
Fig. 3 is an enlarged fragmentary detail, partially in section, of a manual release mechanism which is operated when the film is being extruded.

A rewind lock lever 45 is positioned to engage the ratchet 24 and to normally prevent the knob 4 from turning the film in an extrusion direction. This lever coacts with a manual holding lever 46, both levers being pivoted upon a stud 47. A spring 48 normally moves the manual holding lever 46 in the direction of the arrow shown in Fig. 1 so that a lug 49 carried by this holding lever 46 may engage arm 50 which carries the rewind lock lever. A spring 51, Fig. 3, tends to hold the lug 49 in engagement with the rewind lock lever 45 so that the spring 48 will tend to prevent rewinding. However, if lever 46 is moved in a direction opposite to the arrow, the spring 51 will cause the point of lever 45 to leave the ratchet 24 and extrusion winding can take place.

Figure 3A:
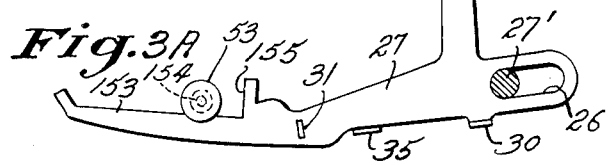
Fig. 3A is a fragmentary detail top plan view of an indexing lever showing its relationship to the trigger and removed from the rest of the camera mechanism.

There is a shutter release plunger 53 having a spring 54, Fig. 11, to control the rotative position of the shutter release lever through engaging one or the other of two flats 55 provided on this lever. The releasing lever 53 also has a beveled surface 56 which is conical in shape, this beveled surface being adapted to engage the indexing lever 27. This engagement as shown in Fig. 3A is always possible along surface 153 although surface 153 can never drop into notch 154 beneath the beveled surface 56. This is not the case with an edge 155 at right angles to edge 153. This edge 155 may, and does, engage notch 154 when it moves to the left from its Fig. 3A position. Edge 155 is for the purpose of latching the trigger down when it enters notch 154 and it occurs when indexing lever 27 is moved to the left of Fig. 1 by its spring 28, or into the positions shown in Figs. 4 and 5.

Referring to Figs. 8 to 11, the shutter may consist of a plate 60 with a pair of sickle-shaped leaves 61 normally covering a shutter aperture 62 through which exposures are made. The leaves 61 are pivoted on like studs 63 and may be turned together through a pin 64 and slot 65 when the former is actuated by a bell crank lever 66 which carries the pin. This bell crank lever moves on a stud 67 and has a cam 68 which is engageable by a pin 69 carried by a lever 70 to which is attached at 71 one end of a hairpin spring 72, the other end of which is attached at 73 to a lever 74 which may be actuated by a pin 75 carried by the shutter release lever 53. Thus, each time the shutter release lever 53 is depressed against the spring 76, pin 73 crosses a dead center between pin 75 and pin 71, tensioning and releasing the hairpin spring 72 in a known manner to cause the shutter blades to rapidly open and close. On return movement of the pin 71, it passes beneath the hook-shaped end 77 at the end of the cam 68 on the bell crank lever. This shutter per se forms no part of my present invention, as obviously any shutter utilizing a shutter release lever 53 can be used. This shutter is, however, a simple one which is entirely suitable for operation with the present film control mechanism.

Assuming that a fresh spool S of film has just been loaded onto the spindle 20 through the door 7, the camera parts will be in the position shown in Fig. 4. The film is now extruded into the chamber 3 by turning the knob 4 in the direction shown by the arrow and this is accomplished while holding the manual lever 46 against the action of its spring 48 so that the film may pass through the guideway 5 past the exposure frame 6 and into a loose coil in the chamber 3. During this movement, the claw 40 lies in the path of the film and, when reached by the film, the film F cams stop point 81 toward and into contact with the film as indicated in Fig. 6. The extruding movement of the knob continues until a film perforation 83, Fig. 13, is reached at which time stop point 81 will drop into the notch being cammed toward the notch by claw 40 riding on the film. Stop point 81 will drop into notch 83 and remain in, thus stopping the winding movement through lever 42 moving arm 50 and thus the lock lever 45 into engagement with the ratchet 24. The point 81 will lie in the Fig. 5 position, through the aperture 83. As the point 81 moves through the film aperture 83, it turns shaft 41 affixed to it, and with it the spring latch lever 42. Fig. 12 shows these parts. Lever 42 swings to Fig. 5 position, striking the over-turned flange 50' of the lever 50 moving pawl 45 into engagement with ratchet 24, thus stopping further movement of shaft 20. Also this causes the spring end 85 of lever 42 to snap over pin 38 carried by counter dial 19, and pin 37 which is a latch element on the counter dial, is unlatched or released from notch 91, thus unlocking the counter dial. In addition, arm 142 moves away from the downwardly-turned lug 35 of the indexing lever 27, releasing it for movement under the impulse of its spring 28. The winding knob 4 is now latched against extrusion movement. The only movement of knob 4 that can be made is in a rewind direction.

By turning knob 4 counterclockwise with reference to the drawings, a key 95 turns with shaft 20. This key has two radial lugs 96, 96 in the form shown as here the knob 4 turns 180° for each exposure area of film. A radial lug 96 forms a driving member for engaging the end 34 of indexing lever 27. This moves the lever 27 until stopped by the end of slot 26 striking pin 27' and this moves the latching surface 155 from out of the trigger notch 154 releasing the trigger latch. Lever 27 may turn on pivot 27', as well as slide, and lug 31 remains in contact with a notch $19^n$ and turns counter dial 19 to the next number, and finally prevents further turning of knob 4 when slot 26 stops on pin 27'. The knob cannot be turned in an opposite direction because of pawl 45 and ratchet 24. The shutter release 56, having been unlocked, must be the next part to be actuated.

Depressing release 53 actuates the shutter leaves 61 and, as it is being depressed, cam 56 cams the indexing lever outwardly or toward the bottom of Fig. 6 as shown in broken lines. This removes index lever 27 and lug 31 from a notch $19^n$ and spring 28, acting on lever 27, moves lug 31 over on projection $19^p$ and into the next notch. The operating end 34 likewise moves up over the key lug 96 and down into the path of the next key lug. Meanwhile, indexing lever edge 155 moves into the notch 154 of the trigger, thereby latching the trigger down. Since now the trigger may not be operated and the knob can be wound in a rewinding direction, only the cycle may be repeated. After all film areas are exposed (here, twenty) the long projection $19^l$ is reached after all exposures are made. Since the index lever 27 cannot move lug 31 to the next notch, it is moved on top of the long projection $19^l$. This holds the indexing lever 27 out of the path of the key lugs 96, so the remaining film is wound on the spool S forming the light-tight covering therefor (since backed film is used). This film area is indicated at O, Fig. 13.

As the film moves from under claw 40, spring 43 turns lever 42 counterclockwise as claw 40 drops into a clearance opening 99, Fig. 4, and point 81 moves away from the film path. Lever 42 with this movement of lever 82 and shaft 41 engages counter dial pin 37 as in Fig. 4 so that the counter dial is always locked when film is out of the camera as is the trigger release 53. Thus, the dial being locked always prevents the notches from getting out of phase. It cannot even be turned by serrations 39.

When lever 42 locks the dial, arm 142 strikes downwardly toward lug 35 of the indexing lever and holds this lever in an inactive position. In this position, a lug 219, carried by the counter dial 19, lies in the position shown in Fig. 4 because it has just been moved by spring arm 220 of arm 221 of the indexing lever operated after making the last—the twentieth here—exposure. During this movement, the locking arm 155 enters the notch 154 of the shutter release 53 so that the trigger is also latched.

In the present instance, the finder frame 13 is notched at 17. When in condition for exposure, Fig. 1, lug 30 lies over the notch 17 and film is wound and the release 53 is unlocked, but after depressing the release 53 to make an exposure, indexing lever 27 moves lug 30 out of the line of sight through the finder and notch and a glance through finder lenses 15, 14 indicates film must first be wound.

Fig. 1 shows the camera ready for the last, the twentieth exposure. After this exposure, indexing lever will engage the long lug 19¹ and will be inoperative. As the film leaves, claw 40 drops into its clearance aperture 99 and rocks. It carries latch element 91 which is moved against latch pin 37, thereby locking the dial 19. Also arm 142 engages the indexing arm 27 to hold it in an inoperative position.

It will be seen that there is provided a device in which the several objects of this invention are achieved and which is well adapted to meet the conditions of practical use.

As various embodiments may readily be made, and as various changes may be made in the embodiments above set forth, it is to be understood that all the matter herein set forth or shown in the accompanying drawings is to be interpreted as illustrative only and not in a limiting sense.

Having thus described my invention, what I claim is new and desire to secure by Letters Patent of the United States is:

1. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, said release lever being movable against the spring to release the pawl from the ratchet, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob.

2. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, whether or not the release lever lug is engaged with the pawl, and against the action of the spring tending to hold the release lever lug and the pawl in contact, said pawl and release lever pivotal mounts comprising a single stud.

3. The film winding control for cameras of the type defined in claim 1, characterized in that the camera body supporting the loosely pivoted lever having a nose on one end and a claw on the other end, is provided with a clearance opening adjacent the film and opposite to the claw whereby the claw, when not supported by the film, may swing across the path of the film and into the clearance opening to raise the opposite end of the pivoted lever so that the nose thereof may lie outside the path of the film to permit the end of the film to pass freely thereunder.

4. The film winding control for cameras of the type defined in claim 1 characterized in that the camera body supporting the loosely pivoted lever having a nose on one end and a claw on the other end, is provided with a clearance opening adjacent the film and opposite to the claw whereby the claw, when not supported by the film, may swing across the path of the film and into the clearance opening to raise the opposite end of the pivoted lever so that the nose thereof may be outside the path of the film to permit the end of the film to pass freely thereunder and in that a counter dial is movably carried by the camera, a latch element is carried on the counter dial, and a latch element is movably carried by the camera and is under control of the nose of the film engaging lever to be released by the lever moving to engage the nose with the film, said lever being movable by the claw as an end of the film moves the claw from its clearance position to engage the surface of the film.

5. The film winding control for cameras of the type defined in claim 1 characterized in that the camera body supporting the loosely pivoted lever having a nose on one end and a claw on the other end, is provided with a clearance opening adjacent the film and opposite to the claw whereby the claw, when not supported by the film, may swing across the path of the film and into the clearance opening to raise the opposite end of the pivoted lever so that the nose thereof may be outside the path of the film to permit the end of the film to pass freely thereunder and in that a counter dial is movably carried by the camera, a latch element is carried on the counter dial, and a latch element is movably carried by the camera and is under control of the nose of the film engaging lever to be released by the lever moving to engage the nose with the film, said lever being movable by the claw as an end of the film moves the claw from its clearance position to engage the surface of the film, and characterized in that there is an indexing lever movably mounted on the camera and that there is an abutment carried by the latch element under control of the nose of the film engaging lever for engaging and holding the indexing lever in an inoperative position, the abutment being removed from said position when the counter dial is unlocked.

6. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, an indexing lever pivotally and slidably mounted on the camera through a pin and slot connection therewith, a key movable by the film winding shaft, a radially projecting lug on the key, a spring normally tending to move the indexing lever into the path of the radially projecting lug whereby turning the knob, and by it the film winding shaft, may engage and move the indexing lever to a stop position limited by the pin and slot connection, to wind an area of film through the film guideway.

7. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, an indexing lever pivotally and slidably mounted on the camera through a pin and slot connection therewith, a key movable by the film winding shaft, a radially projecting lug on the key, a spring normally tending to move the indexing lever into the path of the radially projecting lug whereby turning the knob, and by it the film winding shaft, may engage and move the indexing lever to a stop position limited by the pin and slot connection, to wind an area of film through the film guideway, and a shutter trigger having a beveled surface thereon for swinging the indexing lever to release the radially extending lug on the key.

8. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, an indexing lever pivotally and slidably mounted on the camera through a pin and slot connection therewith, a key movable by the film winding shaft, a radially projecting lug on the key, a spring normally tending to move the indexing lever into the path of the radially projecting lug whereby the knob, and by it the film winding shaft, may engage and move the indexing lever to a stop position limited by the pin and slot connection, to wind an area of film through the film guideway, and a counter dial including a recessed periphery, a lug carried by the indexing lever for engaging a recess in the counter dial and moving it at each actuation of the indexing lever.

9. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, an indexing lever pivotally and slidably mounted on the camera through a pin and slot connection therewith, a key movable by the film winding shaft, a radially projecting lug on the key, a spring normally tending to move the indexing lever into the path of the radially projecting lug whereby the knob, and by it the film winding shaft, may engage and move the indexing lever to a stop position limited by the pin and slot connection, to wind an area of film through the film guideway, and a counter dial including a recessed periphery, a lug carried by the indexing lever for engaging a recess in the counter dial and moving it at each actuation of the indexing lever, a shutter release having a bevel thereon to engage and move the indexing lever when the shutter release is actuated, whereby the lever is moved to clear the radially extending lug from the key and to free the lug from the counter dial notch.

10. A film winding cntrol for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, an indexing lever pivotally and slidably mounted on the camera through a pin and slot connection therewith, a key movable by the film winding shaft, a radially projecting lug on the key, a spring normally tending to move the indexing lever into the path of the radially projecting lug whereby the knob, and by it the film winding shaft, may engage and move the indexing lever to a stop position limited by the pin and slot connection, to wind an area of film through the film guideway, and a counter dial including a recessed periphery, a lug carried by the indexing lever for engaging a recess in the counter dial and moving it at each actuation of the indexing lever, a shutter release having a bevel thereon to engage and move the indexing lever when the shutter release is actuated, whereby the lever is moved to clear the radially extending lug from the key and to free the lug from the counter dial notch, and whereby the indexing lever spring may move the indexing lever in a direction to position said lever in the path of the radially extending key lug and may move the lug on the indexing lever to the next notch in the counter dial.

11. The winding control for cameras, as defined in claim 10, characterized in that the counter dial is provided with one pair of notches spaced by a projection longer than the others at which place the lug on the indexing lever may not reach the next notch but will remain on the longer projection to hold the indexing lever out of the path of the radially extending lug on the key whereby film may then be wound without moving the indexing lever.

12. A film winding control for cameras of the extrusion loading type in which a film having a single perforation a predetermined distance from the film spool is wound from and to the fim spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, a counter dial carried by the camera having a latch element thereon, a latch connected to the loosely pivoted lever adapted to engage and latch the counter dial, said loosely pivoted lever when moved by a film passing through the film guide releasing the latch so that the counter dial may turn.

13. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, a counter dial carried by the camera having a latch element thereon, a latch connected to the loosely pivoted lever adapted to engage and latch the counter dial, said loosely pivoted lever when moved by a film passing through the film guide releasing the latch so that the counter dial may turn, and an indexing lever carried by the camera and lying in the path of a driving key lug for engaging and moving the counter dial.

14. A film winding control for cameras of the extrusion loading type in which a film having a single perforation a predetermined distance from the film spool is wound from and to the film spool, comprising a camera, a film supply chamber, a film storage chamber, an exposure frame, and a film guideway leading from the supply chamber past the exposure frame and to the storage chamber, a film winding shaft carried by the camera and lying in the supply chamber, a winding knob carried by the shaft outside the camera, a ratchet carried by and turning with the shaft, a pivoted pawl carried by the camera and engageable with the ratchet, a release lever pivotally mounted on the camera including a lug engaging the pawl for moving the pawl into engagement with the ratchet, a spring tending to move the pawl and ratchet together attached to the release lever, a second spring tending to hold the pawl against the ratchet, a loosely pivoted lever in the camera having a nose on one end and a claw on the other end, said lever being pressed by a spring to engage the nose and claw with the film whereby the nose may enter the film perforation, and a second lever operable by the loosely pivoted lever for engaging and moving the pawl into engagement with the ratchet to halt the extrusion movement of the knob, a counter dial carried by the camera having a latch element thereon, a latch connected to the loosely pivoted lever adapted to engage and latch the counter dial, said loosely pivoted lever when moved by a film passing through the film guide releasing the latch so that the counter dial may turn, and an indexing lever carried by the camera and lying in the path of a driving key lug for engaging and moving the counter dial, an arm on the latching element carried by the loosely mounted lever also moving from a position blocking movement of the indexing lever when the counter dial latch is released.

15. A film winding control for cameras of the extrusion loading type comprising a camera body, a pair of film chambers connected by a film guideway, an exposure frame in the guideway, a spindle adapted to drivingly receive a spool of film, a ratchet and a key attached to the spindle to turn therewith, an indexing lever having limited slidable movement on the camera and being also turnably mounted on the camera, a nose on the end of said lever for engaging the key, a counter dial having a notched periphery, a lug on said lever for engaging the counter dial, a spring tending to turn and slide the indexing lever lug into contact with the counter dial, a winding knob on the spindle for turning the key, whereby the key may engage the nose and slide the indexing lever to the extent of its limited sliding movement to move the counter dial whereby a film exposure area may be metered, and the film winding knob halted, a shutter release lever including a cam against which the indexing lever may rest, said cam moving the indexing lever to move under the influence of its spring releasing the key and moving the lug from one notch to another of counter dial, thereby releasing the spindle for rotation, a notch in the shutter release lever, a locking arm on the indexing lever being pressed toward and engaging the notch after making an exposure, a spring tending to move the shutter release into a rest position in which the locking arm lies in position to engage the notch.

16. A film winding control for cameras of the extrusion loading type comprising a camera body, a pair of film chambers connected by a film guideway, an exposure frame in the guideway, a spindle adapted to drivingly receive a spool of film, a ratchet and a key attached to the spindle to turn therewith, an indexing lever having limited slidable movement on the camera and being also turnably mounted on the camera, a nose on the end of said lever for engaging the key, a counter dial having a notched periphery, a lug on said lever for engaging the counter dial, a spring tending to turn and slide the indexing lever lug into contact with the counter dial, a winding knob on the spindle for turning the key, whereby the key may engage the nose and slide the indexing lever to the extent of its limited sliding movement to move the counter dial whereby a film exposure area may be metered, and the film winding knob halted, a shutter release lever including a cam against which the indexing lever may rest, said cam moving the indexing lever to move under the influence of its spring releasing the key and moving the lug from one notch to another of counter dial, thereby releasing the spindle for rotation, a notch in the shutter release lever, a locking arm on the indexing lever being pressed toward and engaging the notch after making an exposure, a spring tending to move the shutter release into a rest position in which the locking arm lies in position to engage the notch, a finder on the camera, a signal carried by the indexing lever and movable into and out of the field of view of the finder to indicate the position of the indexing lever and, consequently, whether or not the coacting parts are in position for the operation of the shutter release lever to make an exposure.

17. A film winding control for cameras of the extrusion loading type for use with a spool of film, comprising a camera body containing a film supply chamber, an exposure frame and a film storage chamber, a film guideway leading from the supply chamber past the exposure frame and to the storage chamber, a spool carrying shaft having a knob outside the camera body, a key carried by the shaft having a radially extending lug, a notched counter dial having spaced notches, two of the notches being spaced further apart than the others, a stud on which the counter dial may turn, a one-way clutch permitting counter dial to turn in one direction only, an indexing lever movably mounted and adapted to be in the path of the radially extending lug to be driven thereby, a pin and slot limiting movement of the indexing lever to a fixed extent, a lug on the indexing lever for engaging the counter dial to move it one normal spacing of the notches, a lug on the counter dial movable to a predetermined position as a last exposure is to be made in which position the notches spaced further apart than the normal notches lie adjacent the index lever moving lug whereby said lug may lie against the dial between the more widely spaced notches, a trigger having a cam for releasing the indexing lever, a spring for moving the released indexing lever, and a spring arm carried by the indexing lever and movable against the counter dial lug to move the counter dial as the indexing lever is released, moving the dial to a predetermined position, as the last exposure is made, whereby the indexing lever may be held out of the path of the radially extending key lug and the knob may be turned to completely rewind the film on the original film spool.

18. The film wind control defined in claim 17 characterized in that the dial counter includes a lug and a latch element, the latter positioned by the spring arm of the indexing lever to be latched after the last exposure against further movement, and characterized in that a latching element operated through movement of a double-ended film engaging lever moving as film is moved from the film path engages and latches the dial counter.

19. The film wind control defined in claim 17 characterized in that the dial counter includes a lug and a latch element, the latter positioned by the spring arm of the indexing lever to be latched after the last exposure against further movement, and characterized in that a latching element, operated through movement of a double-ended film engaging lever moving as film is moved from the film path engages and latches the dial counter, said latching element including a blocking arm movable into a position in the path of the indexing lever to hold said lever from the radially extending lug of the key turnable by the winding knob.

References Cited in the file of this patent

UNITED STATES PATENTS

| | | |
|---|---|---|
| 1,879,866 | Aschenbrenner | Sept. 27, 1932 |
| 2,132,680 | Crumaine | Oct. 11, 1938 |
| 2,552,262 | Cumston, Jr. | May 8, 1951 |
| 2,559,892 | Mihalyi et al. | July 10, 1951 |